United States Patent
Liu et al.

(10) Patent No.: US 12,430,251 B2
(45) Date of Patent: Sep. 30, 2025

(54) NETWORK INTERFACE WITH INTELLIGENCE TO BUILD NULL BLOCKS FOR UN-MAPPABLE LOGICAL BLOCK ADDRESSES

(71) Applicant: Intel Corporation, Santa Clara, CA (US)

(72) Inventors: Xiaodong Liu, Shanghai (CN); Ziye Yang, Shanghai (CN); James R. Harris, Chandler, AZ (US); Changpeng Liu, Shanghai (CN); Gang Cao, Shanghai (CN)

( * ) Notice: Subject to any disclaimer, the term of this patent is extended or adjusted under 35 U.S.C. 154(b) by 231 days.

(21) Appl. No.: 17/894,041

(22) Filed: Aug. 23, 2022

(65) Prior Publication Data

US 2023/0130859 A1    Apr. 27, 2023

(30) Foreign Application Priority Data

Aug. 2, 2022   (WO) ................ PCT/CN2022/109664

(51) Int. Cl.
*G06F 12/0811*   (2016.01)
*G06F 3/06*   (2006.01)
*G06F 12/0873*   (2016.01)

(52) U.S. Cl.
CPC ........ *G06F 12/0811* (2013.01); *G06F 3/0605* (2013.01); *G06F 12/0873* (2013.01); *G06F 2212/154* (2013.01)

(58) Field of Classification Search
CPC ............ G06F 12/0284; G06F 12/0811; G06F 12/0873; G06F 2212/154; G06F 2212/214; G06F 2212/261; G06F 2212/7201; G06F 2212/7204; G06F 3/0605; G06F 3/0607; G06F 3/064; G06F 3/0665; G06F 3/067
USPC ....................................... 711/103
See application file for complete search history.

(56) References Cited

U.S. PATENT DOCUMENTS

| | | | |
|---|---|---|---|
| 10,908,842 | B2 | 2/2021 | Oh et al. |
| 11,461,233 | B2 | 10/2022 | Lam et al. |
| 2009/0025082 | A1* | 1/2009 | Ji ........................ H04L 63/1466 726/23 |
| 2009/0089534 | A1* | 4/2009 | Zohar ................... G06F 11/106 711/E12.002 |
| 2010/0169551 | A1 | 7/2010 | Yano et al. |
| 2012/0072652 | A1 | 3/2012 | Celis et al. |
| 2014/0074804 | A1 | 3/2014 | Colgrove et al. |
| 2016/0378396 | A1 | 12/2016 | Ramanujan et al. |
| 2019/0369921 | A1 | 12/2019 | Oh et al. |
| 2020/0249980 | A1 | 8/2020 | Dutta et al. |
| 2020/0363998 | A1 | 11/2020 | Walker et al. |
| 2020/0379915 | A1* | 12/2020 | Moertl ................. G06F 3/0626 |
| 2023/0083104 | A1 | 3/2023 | Xiang et al. |

FOREIGN PATENT DOCUMENTS

KR   20190135746 A   12/2019

* cited by examiner

*Primary Examiner* — Hashem Farrokh
(74) *Attorney, Agent, or Firm* — Haley Guiliano LLP

(57) ABSTRACT

An apparatus is described. The apparatus includes a network interface having a system interface, a media access interface and circuitry to construct a block of null values for a logical block address (LBA) in response to a remote storage system having informed the network interface that the LBA was un-mappable.

20 Claims, 8 Drawing Sheets

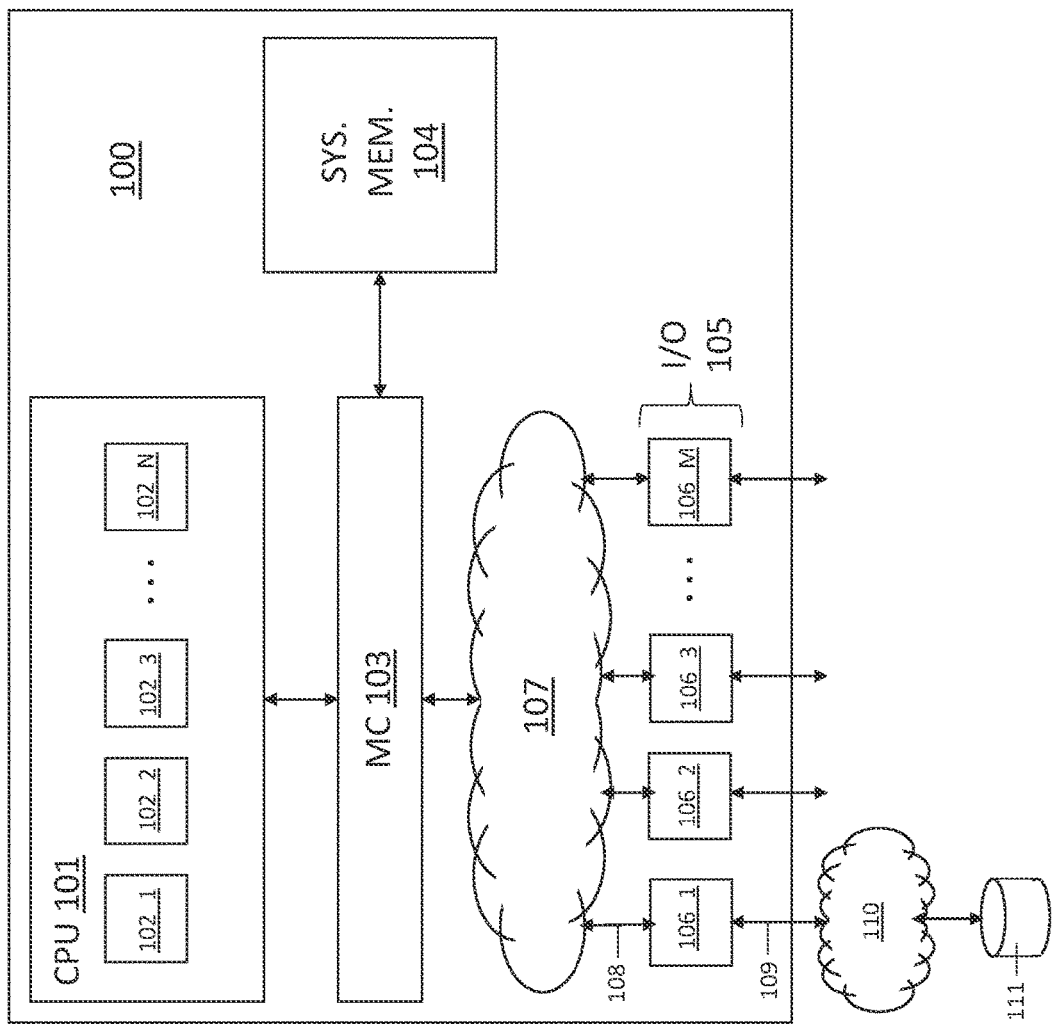
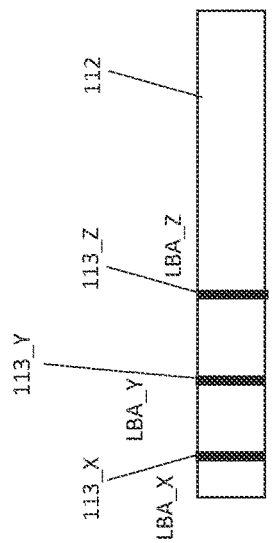
Fig. 1

NETWORK INTERFACE WITH INTELLIGENCE TO BUILD NULL BLOCKS FOR UN-MAPPABLE LOGICAL BLOCK ADDRESSES

RELATED APPLICATION

This application claims the benefit of priority to Patent Cooperation Treaty (PCT) Application No. PCT/CN2022/109664 filed Aug. 2, 2022. The entire content of that application is incorporated by reference.

BACKGROUND

In an era of big data, large amounts of data are continually being sent by remote storage systems to other systems that requested the data. Overall performance can therefore suffer if precautions are not taken to diminish the transportation of non-substantive information and/or marginally substantive information over a network that separates a remote storage system and a requesting system.

FIGURES

FIG. 1 shows a computing system coupled to a remote storage system;

DETAILED DESCRIPTION

Figure 2:
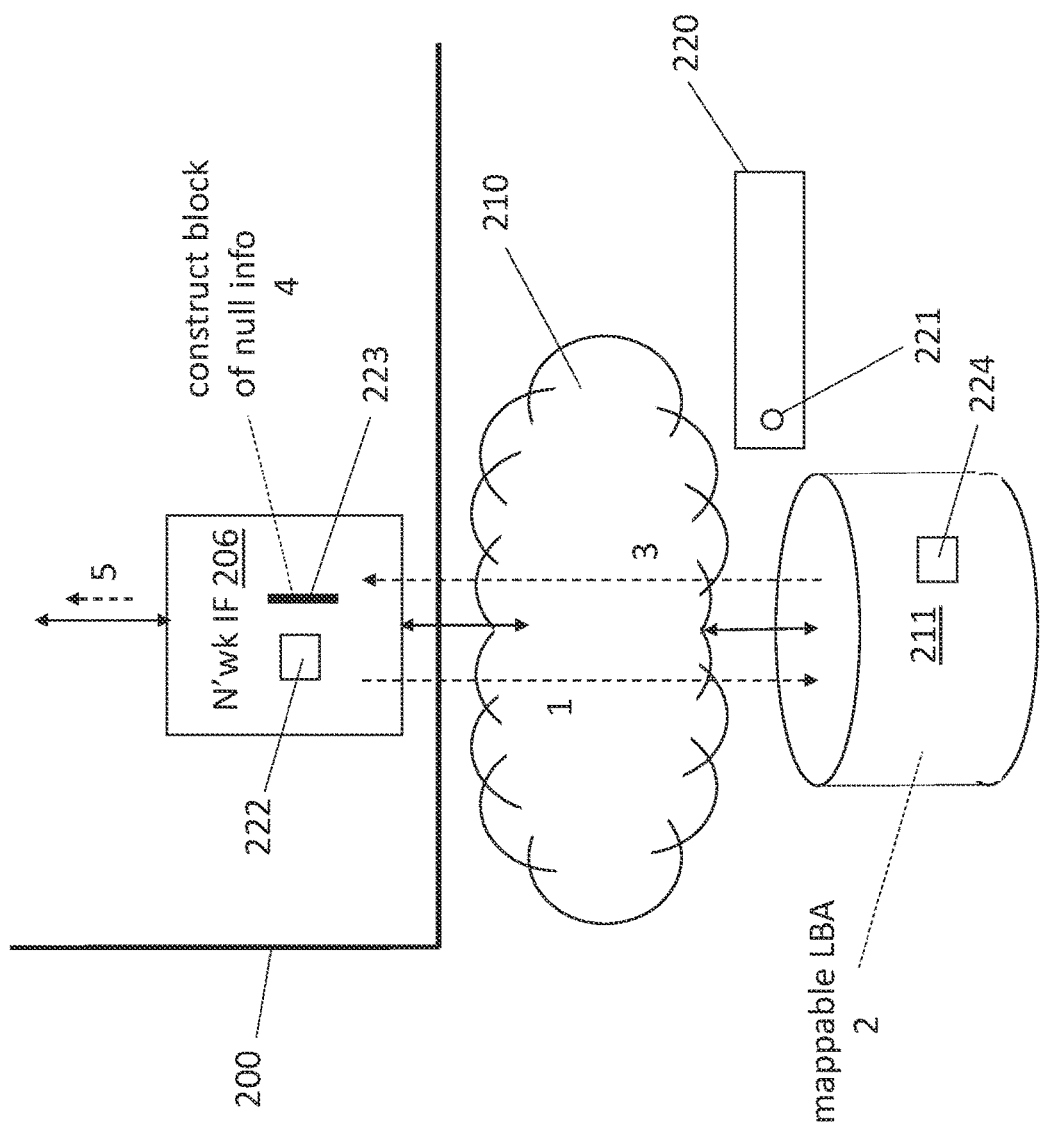
FIG. 2 depicts a first approach for handling a read request that includes an un-mappable LBA.

FIG. 1 outlines some basic components of a computer system 100. As observed in FIG. 1, the computer system 100 includes a central processing unit (CPU) 101 which commonly includes multiple processing cores 102_1 through 102_N. The processing cores 102_1 through 102_N execute the operating system and application software (among other possible types of software such as a virtual machine monitor or hypervisor) that is installed on the system 100.

The CPU 101 is coupled to a memory controller 103. The memory controller is coupled to a system memory 104 (also referred to as a main memory). The processing cores 102_1 through 102_N fetch program code instructions from the main memory 104 in order to execute their respective software algorithms. Such instructions commonly perform mathematical or other operations on data that is read from main memory 104. New data that results from the operations is also commonly written back to main memory 104.

Information (including the data described just above) is often received by the computer system 100 or transmitted from the computer system 100. As such, the computer system includes an Input/Output ("I/O") function 105 that includes multiple network interfaces 106_1 through 106_M.

Here, much of the information that is received by the computer system 100 is received by one of the network interfaces 106_1 through 106_N and transferred to some other component within the computer system (e.g., the memory controller 103 so that the newly received information can be written into main memory 104). Likewise, information that is to be transmitted from the computer system 100 is sent to one or more of the network interfaces 106_1 through 106_N by some other component within the computing system 100 for transport over the interface's corresponding network(s).

The network interfaces 106_1 through 106_N have traditionally been designed to perform "media access" functions which typically include low level communication protocol processing and physical layer processing. The network interfaces 106_1 through 106_N include a system interface 108 and one or more network ingress/egress lines that are coupled to one or more external networks (for ease of drawing only one ingress/egress line 109 and one external network 110 is depicted).

Integrating the network interfaces 106_1 through 106_N with some higher intelligence can be useful to, e.g., reduce inefficient information flows within the computer system 100. One such inefficiency is a read operation of a remote "thin" provisioned storage system 111 where the read operation targets a block that is unmapped. In the case of thin provisioned storage, an amount of storage space 112 is broken down into smaller units of storage, referred to as "blocks" (for ease of drawing, only three of the blocks 113_x, 113_y, 113_z within storage space 112 are individually depicted).

Each of the individual blocks within the storage space 110 have a unique logical block address (LBA). In a nominal read operation, the computer system 100 sends a read request for the contents of one or more LBAs in the request. When the remote storage system 111 receives the read request it maps the LBAs in the read request to corresponding blocks in the storage system's physical storage. The storage system 111 reads the contents of the blocks in physical storage, packs the content into one or more response packets, and sends the response packet(s) to the requesting computer system 100. Here, the remote storage system 111 includes a look-up table (LUT) or similar function that converts the LBAs received in the read request to actual storage locations in the remote storage's physical storage resources.

In some cases, the computer system 100 will issue a read request that includes an LBA for which no mapping exists in the remote storage system's LUT or that the storage system cannot otherwise resolve (un-mappable LBA). In this case, the remote storage system 111 effectively builds a full response of "dummy values" such as null values (e.g., 0s) or other content that is recognized as not being a substantive response. Thus, for instance, if the blocks are configured to be 4 kilobytes (KB) in size, for each un-mappable block, the remote storage system 111 will build an artificial read response of 4 KB worth of null values, pack them into the read response, and then send the read response back to the requesting computer system 100. The application (or other function) of the computing system 101 that requested the data ideally understands that the full field of null values is a "dummy" response and that the LBA that was requested is not recognized as a valid LBA by the remote storage system 111.

The sending of multiple KBs of null values (or more) over the network 107 to the requesting computer system 100 is inefficient in terms of network resources (the network is required to transport worthless information).

FIG. 2 shows an improved approach in which the remote storage system 211 does not pack a full block's worth of null information into a read response for an LBA that the remote storage system 211 cannot resolve. Rather, in the improved approach of FIG. 2, after the remote storage system 211 receives a read request 1 sent by a networking interface 206 within a computer system 200 and recognizes 2 that an LBA specified within the read request 1 does not having a corresponding physical address within the storage system 211, the remote storage system 211 embeds information 221 (having a much smaller footprint than a block's worth of information) in one or more response packets 220 that indicates that a requested LBA was un-mappable. The response packet 220 is then sent 3 to the network interface 206. Importantly, the remote storage system 211 does not send a block's worth of null information for the un-mappable block.

Intelligence 222 that is integrated within the network interface 206, when processing the read response packet(s) 220, recognizes the information 221 and understands that a requested LBA was un-mappable within the remote storage system 211. The intelligence 222, in response, builds 4 a block's worth of null information 223 within the network interface 206 and inserts it into the formal read response 5 that is sent deeper within the computing system 200 (e.g., to a memory controller that writes the information in main memory).

The subsequent processes within the computer system 200 then proceed as per nominal operation (e.g., the requesting entity receives the block of null information and recognizes that there is a problem with the null information's LBA).

Importantly, the remote storage system's refusal to construct and send a full block of null information for the un-mappable block conserves networking resources within the network 210 that separates the network interface 206 and the remote storage system 211 and conserves packet processing resources within the network interface 206. The conservation of such resources should allow the network 210 and network interface 206 to service other request/responses sooner than they otherwise would have been able to.

The information 221 can take on various forms depending on implementation. For example, according to various approaches, the information 211 is one or more bits within header information of one or more response packets 220 that informs the network interface 206 that one or more of the requested blocks were un-mappable.

In various embodiments, the read request issued 1 by the network interface 206 specifies one or more blocks to be read (the unique LBA for each requested block is provided in the request). The remote storage system 211, correspondingly, has functionality 224 to indicate which one or more blocks in the request 1 are un-mappable.

For example, in a basic case, only one block is requested and the remote storage system 211 sets a bit 221 in the header of a response packet 220 that indicates whether the block was mappable or not (e.g., 1=mappable; 0=unmappable).

In other instances, more than one block can be requested in a read request. In this case, the read request 1 contains multiple LBAs (one respective LBA for each block being requested in the request). Here, feedback information 221 within the response packet(s) 220 issued by the remote storage system 211 include one or more fields that specify which particular ones of the requested blocks are un-mappable (if any).

As just one example, if a maximum of up to eight blocks can be requested per request, the read request can contain up to eight LBAs. The header information of the response packet(s) 220 constructed by the remote storage system 211 contain a byte of information 221 where each bit in the byte corresponds to a different one of the eight LBAs. If any of the requested blocks are un-mappable, the remote storage system 211 sets the corresponding bits in the byte of information 221 to indicate which specific blocks were un-mappable, and, furthermore, does not construct and send a block's worth of null information for any of the un-mappable blocks.

Upon processing the response packet(s) 220, the intelligence 222 within the network interface 206 processes the byte of information, builds 4 a block's worth of null information 223 for each un-mappable block, and, e.g., inserts each block of null information into the appropriate location in the response stream 5 that is sent deeper within the computer system 200. For example, if the second and fourth blocks in the read request 1 were un-mappable, the intelligence 222 inserts a blocks worth of null information in the second and fourth locations in a response stream 5 that is composed of eight blocks worth of information.

An issue is the sheer number of LBAs that can be included in a read request. Here, in an era of big data, a read request can include thousands of the LBAs. A potential problem is the amount of available header space in the response packet(s) 220. Specifically, for read/response cycles having a large number of un-mappable LBAs, the feedback information 221 may not have enough bits to uniquely identify each un-mappable LBA.

In one approach to address this issue, as part of the read response, the storage system 211 constructs a data structure that describes which LBAs are un-mappable and then compresses the data structure (e.g., with a de-duplication compression process or other compression process). The compressed data structure ideally has a small enough footprint to fit into the header space 221 of the response packet(s) 220 that is reserved for the un-mappable LBA feedback information.

Upon receiving the response packet(s) 220, the network interface intelligence 222 extracts the feedback information 221 and decompresses it so that the original data structure describing which specific LBAs were un-mappable is obtained. The network interface intelligence 222 then proceeds to create blocks of null values for those blocks that were un-mappable and inserts them into their corresponding locations in the response stream 5.

In an embodiment, the data structure includes a unique bit for every requested LBA. The bits are arranged in the order that their corresponding LBAs were requested and have a first value (e.g., 1) if the LBA was mappable and a second value (e.g., 0) if the LBA was un-mappable. Here, even if thousands of LBAs were requested in the response and the data structure therefore includes thousands of bits, if a de-duplication compression process is used, the data structure can be compressed into a much smaller footprint if it contains long runs of the same bit value.

In a further embodiment, if the entire data structure cannot be compressed into the amount of header space 221 that is reserved for the feedback information, the storage system 211 only takes a portion of the data structure, compresses the portion and inserts the compressed portion into the header space 221. Here, as just one example, if the de-duplication process results in a data structure that is too large for space 221, the storage system 211 applies the de-duplication process only to a leading portion of the data structure. The compression over the smaller amount of information results in a smaller amount of compressed information that fits into the header space 221.

In various embodiments, the storage system 211 uses as much of the compressed data structure as will fit into the header space 221. In other embodiments, the storage system 211 re-compresses some predetermined portion of the data structure. Here, the storage system 211 re-compresses a first larger portion (e.g., first three quarters) of the data structure and if the compressed data structure fits into the header space 221 it is inserted into the header space 221. If it does not fit into the header space 221, the storage system compresses a next, smaller portion (e.g., first half). The process then continues until the compressed information reaches a reduced size that fits into space 221.

For those un-mappable LBAs that are not identified in the feedback information 221, the storage system 211 builds blocks of null values for them and sends them as dummy block data back to the requesting system 200.

In yet another embodiment, the storage system 211 on its own initiative sends a communication to the requesting network interface 206 that includes the afore mentioned data structure. Here, the communication can include a packet that is unilaterally sent to the requesting interface 206 by the storage system 211 whose payload identifies the request (e.g., with a request ID that was embedded in a read request sent by the network interface 206 to the remote storage system 211) and includes the data structure (compressed or un-compressed) that identifies which LBAs in the request are un-mappable. The intelligence 222 in the network interface 206 then builds dummy blocks for the identified LBAs for insertion into the response stream 5.

In yet another embodiment, feedback information 221 is composed of only one bit and is only set by the storage system 211 if all LBAs in the request were determined to be un-mappable.

Another approach to handling requests having large numbers of LBAs (and therefore the possibility of large numbers of un-mappable LBAs that cannot be specifically identified in feedback information 221) is to provide the intelligence 222 in the networking interface 206 beforehand with information that identifies which LBAs in a request are un-mappable. With this information, the intelligence 222 can flag those LBAs that are an un-mappable as part of the process of preparing a read request that is to be sent to the remote storage system 211. Here, the intelligence 222 does not include any such un-mappable LBAs in the read request and configures itself to locally construct a block's worth of null values for the un-mappable LBAs for insertion into the response stream 5.

Figure 3:
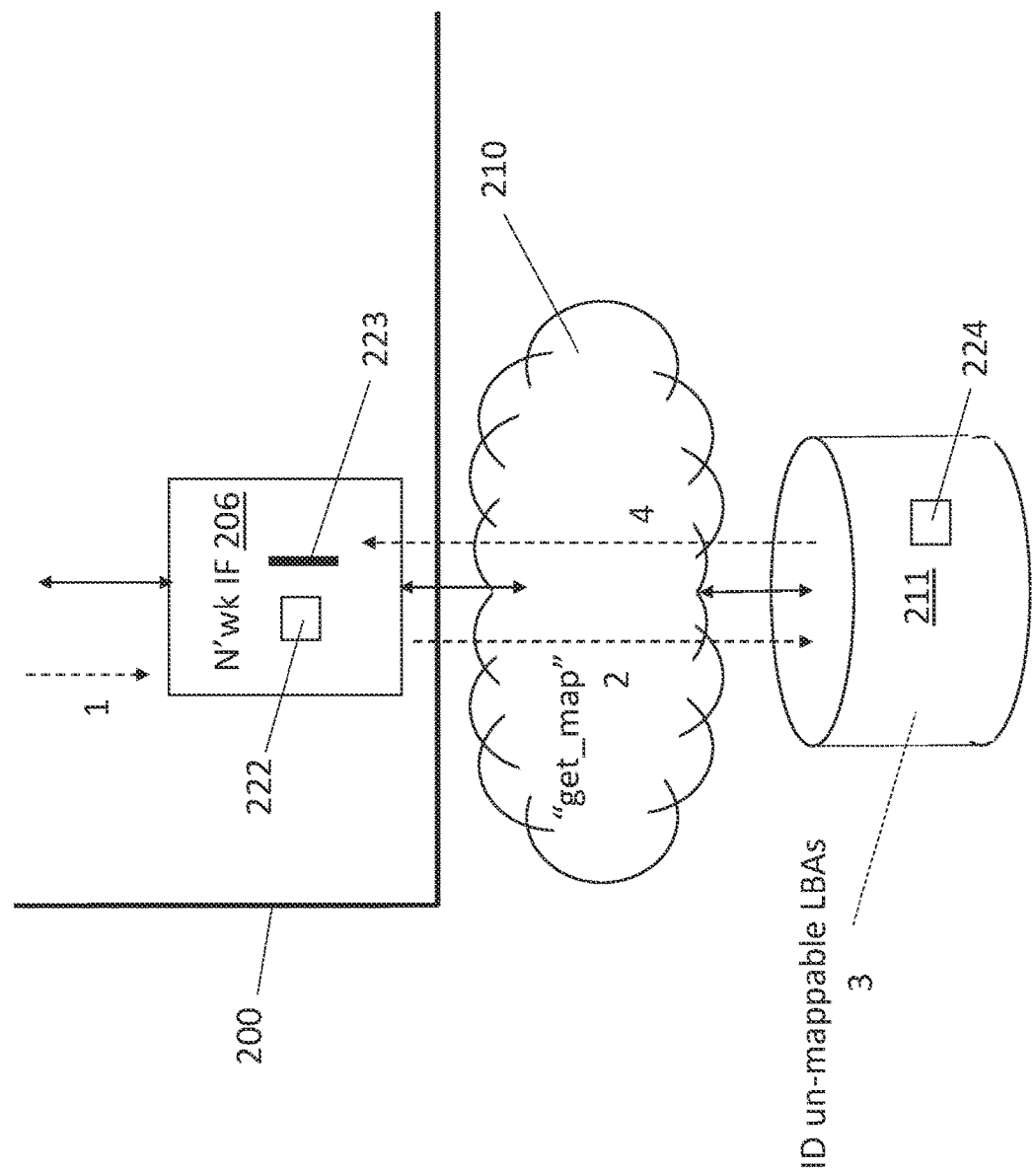
FIG. 3 depicts a second approach for handling a read request that includes an un-mappable LBA.

FIG. 3 shows a process for providing the intelligence 222 within the network interface 206 with the LBAs of un-mappable blocks for a particular read request. According to the process of FIG. 3, the network interface 206 receives a read request 1 for a number X of blocks. If X is below some threshold value the process continues as described above with respect to FIG. 2 (no attempt is made at the network interface 206 side to understand if any LBAs to be requested are un-mappable).

By contrast, if X is above some threshold (e.g., a thousand, a few thousand, ten thousand, etc.,), the network interface 206 sends 2 an initial request ("get_map") to the remote storage system 211 that lists the LBAs that are about to be included in the read request. The remote storage system 211, in response, analyzes 3 its internal (e.g., LUT) information to see if any of the LBAs listed on the get_map request is un-mappable. The remote storage system 211 then sends a response 4 that identifies those LBAs listed in the get_map request that the storage system 211 found to be un-mappable.

Upon receiving the response to the get_map request, the intelligence 222 within the network interface 206 constructs a read request that includes those LBAs that are not un-mappable and sends the request to the remote storage system 211. With none of the requested LBAs being un-mappable, the remote storage system 211 sends the block of information for each requested LBA. While the read request/response cycle between the network interface 206 and the remote storage system 211 is happening, the intelligence 222 in the network interface 206 can begin preparing blocks of null values for the LBAs identified in the original request (1 in FIG. 3) that were found, through the get_map request, to be un-mappable. Ideally, such blocks of null values are fully prepared and ready for insertion into the response stream 5 by the time the read response from the remote storage system 211 is received.

In various embodiments, the above described get_map function can be used with storage protocols that do, or do not, include feedback information 221 that indicates whether certain LBAs are un-mappable (or all LBAs are un-mappable). For those embodiments that combine the get_map function with a storage protocol that includes such feedback information 221 and the feedback information 221 is limited in terms of the number of LBAs that can be uniquely identified as un-mappable, the threshold value X is based on that limitation. For example, if the feedback information 221 is able to uniquely identify 1000 different LBAs, X is set at some value larger than 1000 (e.g., 1001). So doing ensures the feedback information 221 and get_map function work harmoniously to avoid transfer of null blocks over the network irrespective of the number of LBAs in any particular read request.

The network 210 can be any of a number of different physical communication platforms such as a peripheral component interconnect express (PCIe) network (where bus extensions are viewed as a form of network), transmission control protocol/internet protocol (TCP/IP), Ethernet network, Infiniband network, Fibre Channel network or other type of network having multiple possible traffic sources and multiple possible traffic destinations 210.

The communication protocol that is communicated over the network 210 between the network interface 206 and the remote storage system 211, including the aforementioned packet exchanges including the read request packet(s) sent by the network interface 206 and the response packet(s) 220 sent by the remote storage system 211, can be any of a number of different storage and/or remote memory related communication protocols such as non volatile memory express (NVMe), non volatile memory express over fabrics (NVMe-of), Remote Direct Memory Access (RDMA), Serial ATA (SATA), Small Computer System Interface (SCSI), Internet Small Computer System Interface (iSCSI), among possible others.

Figure 4:
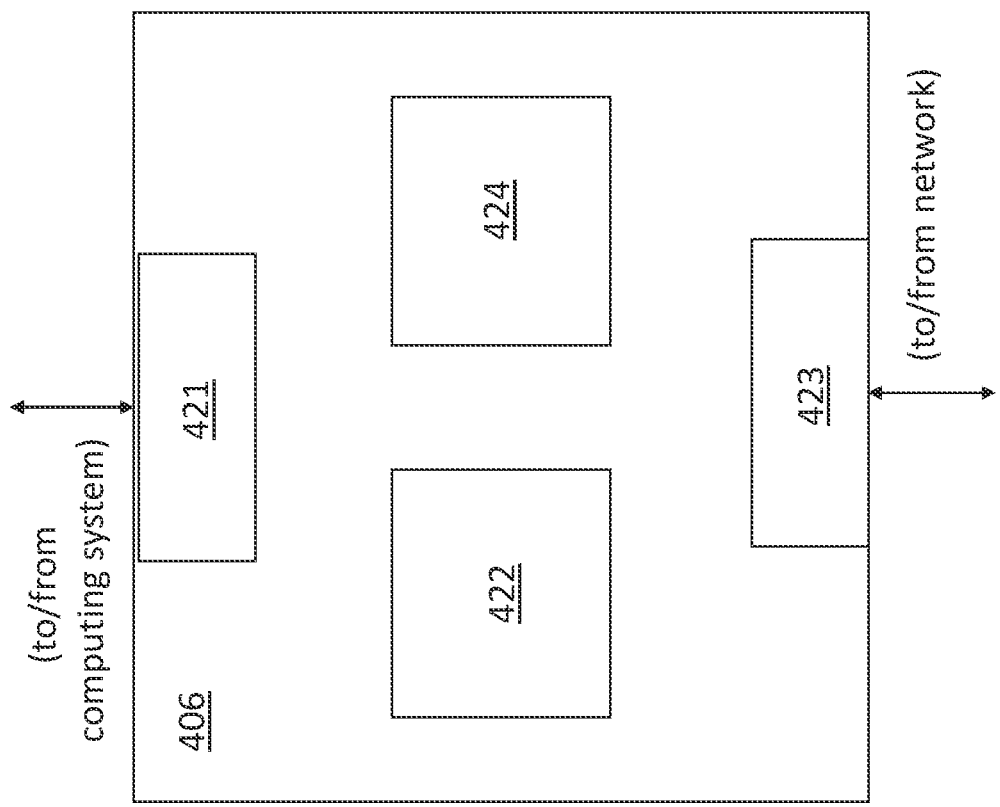
FIG. 4 shows a network interface.

FIG. 4 shows an embodiment of the networking interface 406. As observed in FIG. 4, the networking interface 406 includes a system interface 421 and a networking interface 423. In various embodiments the system interface 421 enables communication between the networking interface 406 and various components (e.g., processing cores, memory controller, accelerator(s), etc.) of a larger computing system that the networking interface 406 is integrated into. In various embodiments the networking interface 406 is a type peripheral attachment to the larger system and the network interface 406 therefore corresponds to a peripheral interconnect communication platform (e.g., PCIe). In other embodiments the system interface 406 is a deeper, internal computing system communication platform (e.g., QuickPath Interconnect (QPI), HyperTransport (HT), InfiniBand, among possible others).

In other embodiments the network interface 406 is not integrated into a computing system but is instead integrated into some other system (e.g., a networking switch). In this case, the system interface 406 corresponds to some internal communication platform of the system.

In various embodiments the networking interface 406 is physically embodied as a separate module or card (e.g., OAM module, PCIe card, etc.) that plugs into a larger computer system or other system (e.g., edge system, network switch, etc.), e.g., according to a mechanical and electrical interface specification defined by the applicable system interface 421.

The network interface 406 also includes a media access interface 423 for communicating to/from the network 210 that is coupled to the remote storage system 211. Here, the media access interface 423 includes physical layer functionality for the specific type of network that network interface communicates over.

The network interface also includes intelligence 422 and memory 424. Intelligence 422 performs the aforementioned functionality of the network interface 406 including the preparing and sending of read requests, the processing of the responses to the read requests, the processing of any information sent by a remote storage system that describes if any LBAs are unmappable, the construction of dummy blocks of null values for any such LBAs and their insertion into a read response stream. The intelligence can be implemented with dedicated logic hardware circuitry (e.g., custom ASIC), programmable logic circuitry (e.g., field programmable gate array circuitry), processor logic circuitry that executes program code to perform networking interface function(s) (e.g., embedded processor or controller) or any combination of these.

Memory 424 serves as a buffer for the information flow between the larger computer system and the remote storage. Here, in various embodiments, the intelligence 422 constructs one or more blocks of null values for un-mappable LBAs in memory 424 and reads such dummy blocks out of memory 424 for insertion into (the appropriate location in) a read response stream that is sent over the system interface 421.

In various embodiments the networking interface 406 is identified or otherwise recognized as an information processing unit (IPU) of a computing system.

Although embodiments above have been directed to read requests, the teachings above can also be applied to write requests. Here, in particular, for write requests that intend to write a large number of blocks, the get_map function can be performed so that the network interface is informed ahead of time of which target blocks are un-mappable. The network interface then proceeds to send a write request that does not include the LBAs and write data for the un-mappable blocks.

Figure 5:
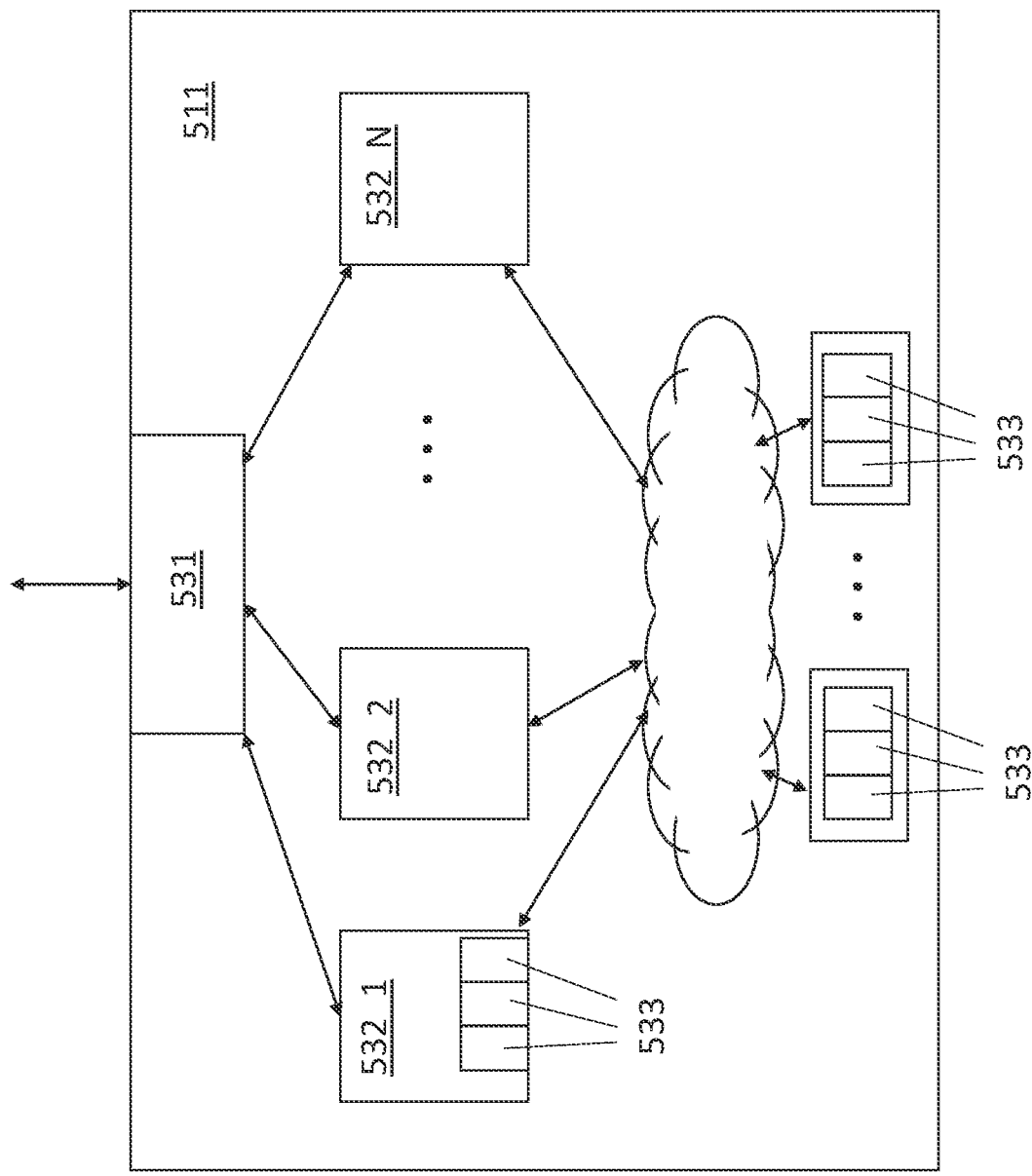
FIG. 5 shows a storage system.

FIG. 5 shows an embodiment of a remote storage system 511. As observed in FIG. 5, a remote storage system can be composed of a plurality of computing systems 532_1 through 532_N and a plurality of physical storage devices 533 (e.g., magnetic disk drives, solid state drives (SSDs), persistent memory SSDs and/or DIMMs, etc.). The remote storage system 511 also includes a network interface 531 to communicate with the network 210 that couples the remote storage system 511 to the system 200 having the intelligent network interface 206. Some or all of the storage system's physical storage devices 533 may be integrated with (e.g., are peripherals of) some or all of the storage system's computing systems 532. The storage system's computing systems 532_1 through 532_N typically process incoming read and write requests and apply them to those of the storage devices 533 that are targeted by the requests. The storage devices 533 also typically include a controller or other intelligence that enables the storage devices 533 to perform various functions other than sheer writes/reads to/from the storage media.

As such, the aforementioned functionality of the storage system 511 (identification of un-mappable LBAs, processing and insertion of feedback information 221 into response packet(s) 220, process and respond to get_map requests, etc.) can be performed by one or more of the computing systems 532 and/or the storage devices 533 by dedicated logic hardware circuitry (e.g., custom ASIC), programmable logic circuitry (e.g., field programmable gate array circuitry), processor logic circuitry that executes program code to perform networking interface function(s) (e.g., embedded processor or controller) or any combination of these of the computing systems 532 and/or storage devices.

Figure 6:
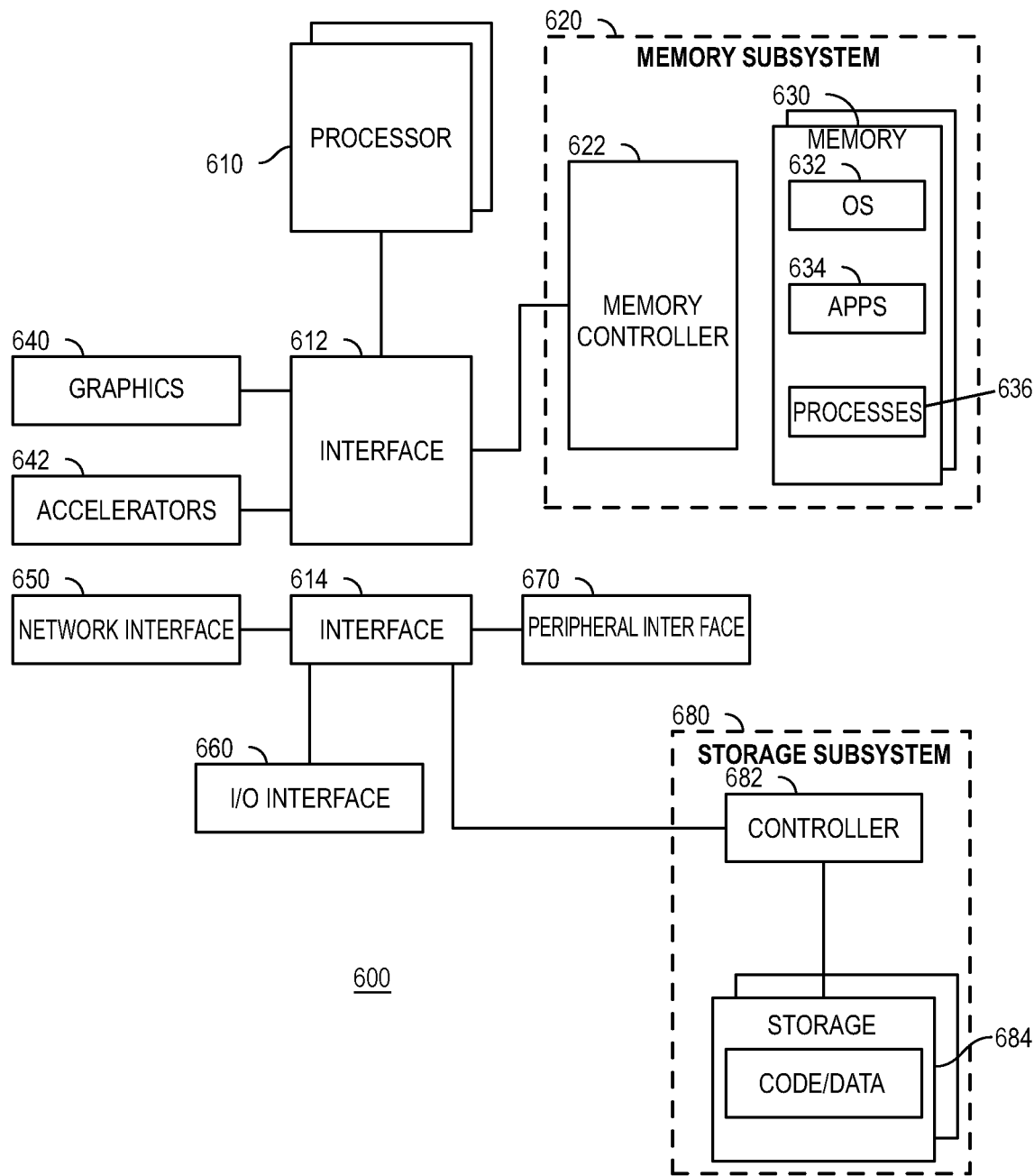
FIG. 6 shows an electronic system.
Figure 7:
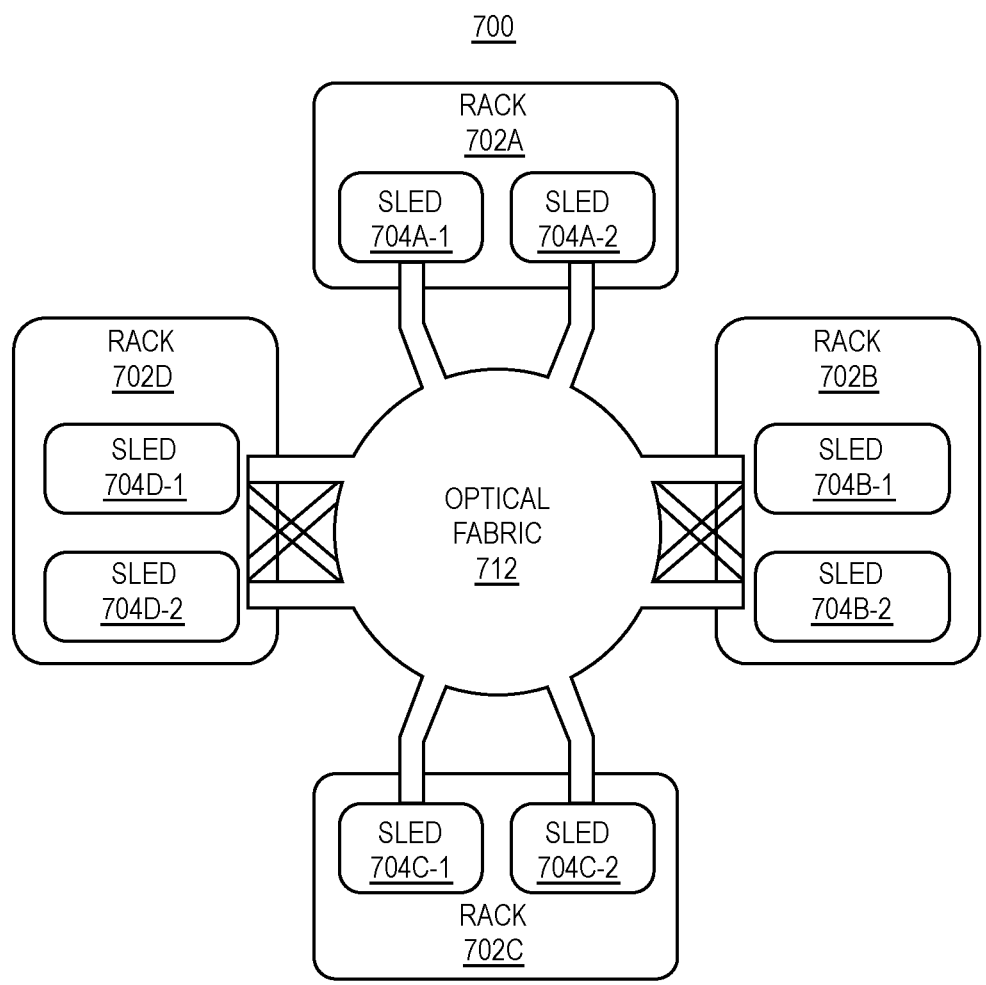
FIG. 7 shows a data center.
Figure 8:
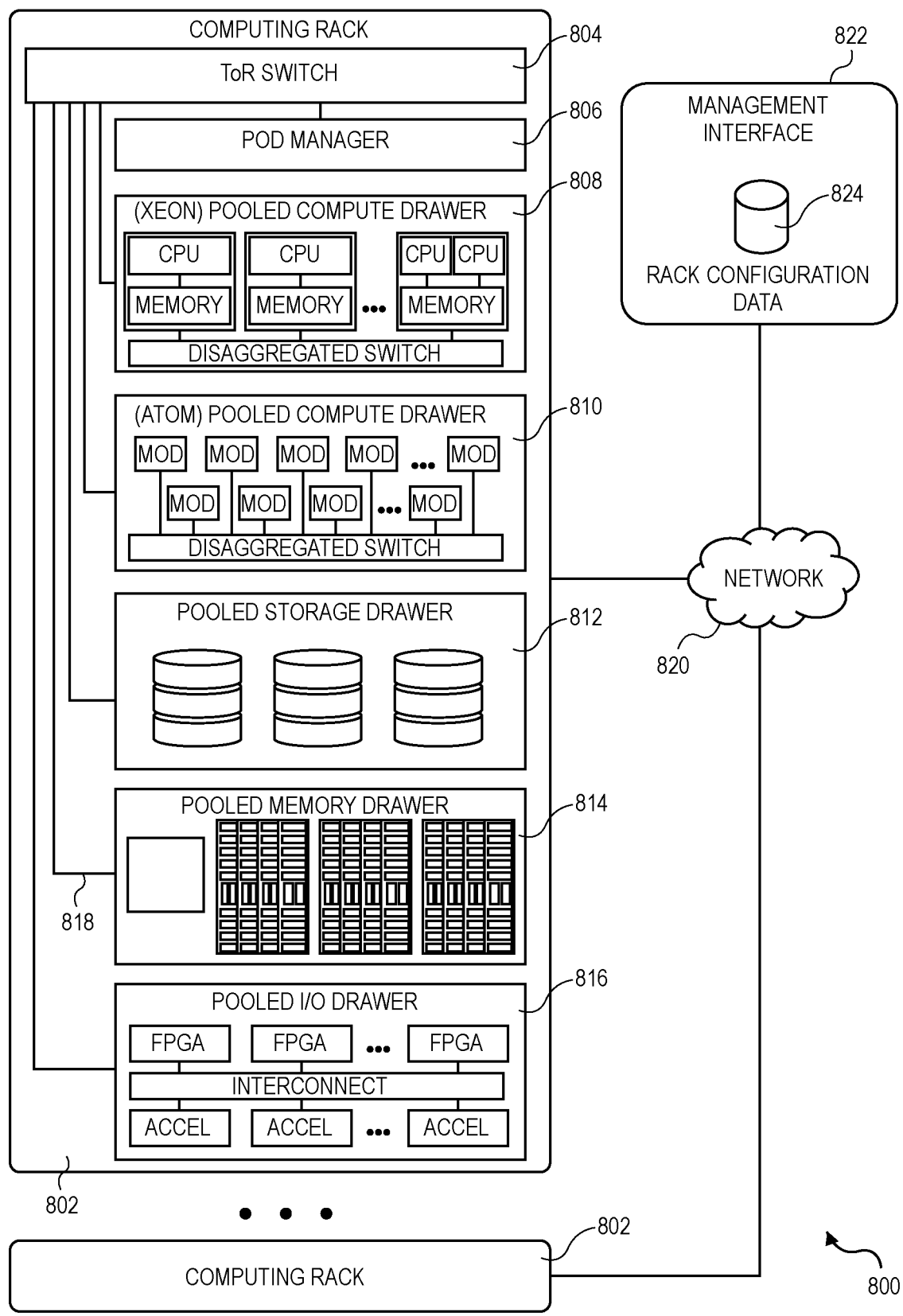
FIG. 8 shows a rack.

The following discussion concerning FIGS. 6, 7, and 8 are directed to systems, data centers and rack implementations, generally. FIG. 6 generally describes possible features of an electronic system that can include a network interface having intelligence to perform the un-mappable LBA functions described above. FIG. 7 describes possible features of a data center that can include such electronic systems and/or a remote storage system that performs the un-mappable LBA functions described above. FIG. 8 describes possible features of a rack having one or more electronic systems having an intelligent network interface to perform un-mappable LBA functions as described above and/or having one or more components of a remote storage that can perform un-mappable LBA functions as described above.

FIG. 6 depicts an example system. System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Certain systems also perform networking functions (e.g., packet header processing functions such as, to name a few, next nodal hop lookup, priority/flow lookup with corresponding queue entry, etc.), as a side function, or, as a point of emphasis (e.g., a networking switch or router). Such systems can include one or more network processors to perform such networking functions (e.g., in a pipelined fashion or otherwise).

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a fixed function offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), "X" processing units (XPUs), programmable control logic circuitry, and programmable processing elements such as field programmable gate arrays (FPGAs). Accelerators 642, processor cores, or graphics processing units can be made available for use by artificial intelligence (AI) or machine learning (ML) models. For example, the AI model can use or include any or a combination of a reinforcement learning scheme, Q-learning scheme, deep-Q learning, or Asynchronous Advantage Actor-Critic (A3C), convolutional neural network, recurrent convolutional neural network, or other AI or ML model. Multiple neural networks, processor cores, or graphics processing units can be made available for use by AI or ML models.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, volatile memory, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software functionality to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610. In some examples, a system on chip (SOC or SoC) combines into one SoC package one or more of: processors, graphics, memory, memory controller, and Input/Output (I/O) control logic circuitry.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random-Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory), JESD235, originally published by JEDEC in October 2013, LPDDR5, HBM2 (HBM version 2), or others or combinations of memory technologies, and technologies based on derivatives or extensions of such specifications.

In various implementations, memory resources can be "pooled". For example, the memory resources of memory modules installed on multiple cards, blades, systems, etc. (e.g., that are inserted into one or more racks) are made available as additional main memory capacity to CPUs and/or servers that need and/or request it. In such implementations, the primary purpose of the cards/blades/systems is to provide such additional main memory capacity. The cards/blades/systems are reachable to the CPUs/servers that use the memory resources through some kind of network infrastructure such as CXL, CAPI, etc.

The memory resources can also be tiered (different access times are attributed to different regions of memory), disaggregated (memory is a separate (e.g., rack pluggable) unit that is accessible to separate (e.g., rack pluggable) CPU units), and/or remote (e.g., memory is accessible over a network).

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect express (PCIe) bus, a HyperTransport link or network or other front side processor communication structure, a small computer system interface (SCSI) bus, Remote Direct Memory Access (RDMA), Internet Small Computer Systems Interface (iSCSI), NVM express (NVMe), Coherent Accelerator Interface (CXL), Coherent Accelerator Processor Interface (CAPI), Cache Coherent Interconnect for Accelerators (CCIX), Open Coherent Accelerator Processor (Open CAPI) or other specification developed by the Gen-z consortium, a universal serial bus (USB), or an Institute of Electrical and Electronics Engineers (IEEE) standard 1394 bus.

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a remote device, which can include sending data stored in memory. Network interface 650 can receive data from a remote device, which can include storing received data into memory. Various embodiments can be used in connection with network interface 650, processor 610, and memory subsystem 620.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data in a persistent state (e.g., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (e.g., the value or state of the data is indeterminate if power is interrupted to system 600). In one example, storage subsystem 680 includes controller 682 to interface with storage 684. In one example controller 682 is a physical part of interface 614 or processor 610 or can include circuits in both processor 610 and interface 614.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base, and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented as a disaggregated computing system. For example, the system 600 can be implemented with interconnected compute sleds of processors, memories, storages, network interfaces, and other components. High speed interconnects can be used such as PCIe, Ethernet, or optical interconnects (or a combination thereof). For example, the sleds can be designed according to any specifications promulgated by the Open Compute Project (OCP) or other disaggregated computing effort, which strives to modularize main architectural computer components into rack-pluggable components (e.g., a rack pluggable processing component, a rack pluggable memory component, a rack pluggable storage component, a rack pluggable accelerator component, etc.).

Although a computer is largely described by the above discussion of FIG. 6, other types of systems to which the above described invention can be applied and are also partially or wholly described by FIG. 6 are communication systems such as routers, switches, and base stations.

FIG. 7 depicts an example of a data center. Various embodiments can be used in or with the data center of FIG. 7. As shown in FIG. 7, data center 700 may include an optical fabric 712. Optical fabric 712 may generally include a combination of optical signaling media (such as optical cabling) and optical switching infrastructure via which any particular sled in data center 700 can send signals to (and receive signals from) the other sleds in data center 700. However, optical, wireless, and/or electrical signals can be transmitted using fabric 712. The signaling connectivity that optical fabric 712 provides to any given sled may include connectivity both to other sleds in a same rack and sleds in other racks.

Data center 700 includes four racks 702A to 702D and racks 702A to 702D house respective pairs of sleds 704A-1 and 704A-2, 704B-1 and 704B-2, 704C-1 and 704C-2, and 704D-1 and 704D-2. Thus, in this example, data center 700 includes a total of eight sleds. Optical fabric 712 can provide sled signaling connectivity with one or more of the seven other sleds. For example, via optical fabric 712, sled 704A-1 in rack 702A may possess signaling connectivity with sled 704A-2 in rack 702A, as well as the six other sleds 704B-1, 704B-2, 704C-1, 704C-2, 704D-1, and 704D-2 that are distributed among the other racks 702B, 702C, and 702D of data center 700. The embodiments are not limited to this example. For example, fabric 712 can provide optical and/or electrical signaling.

FIG. 8 depicts an environment 800 that includes multiple computing racks 802, each including a Top of Rack (ToR)

switch 804, a pod manager 806, and a plurality of pooled system drawers. Generally, the pooled system drawers may include pooled compute drawers and pooled storage drawers to, e.g., effect a disaggregated computing system. Optionally, the pooled system drawers may also include pooled memory drawers and pooled Input/Output (I/O) drawers. In the illustrated embodiment the pooled system drawers include an INTEL® XEON® pooled computer drawer 808, and INTEL® ATOM™ pooled compute drawer 810, a pooled storage drawer 812, a pooled memory drawer 814, and a pooled I/O drawer 816. Each of the pooled system drawers is connected to ToR switch 804 via a high-speed link 818, such as a 40 Gigabit/second (Gb/s) or 100 Gb/s Ethernet link or an 100+Gb/s Silicon Photonics (SiPh) optical link. In one embodiment high-speed link 818 comprises an 600 Gb/s SiPh optical link.

Again, the drawers can be designed according to any specifications promulgated by the Open Compute Project (OCP) or other disaggregated computing effort, which strives to modularize main architectural computer components into rack-pluggable components (e.g., a rack pluggable processing component, a rack pluggable memory component, a rack pluggable storage component, a rack pluggable accelerator component, etc.).

Multiple of the computing racks 800 may be interconnected via their ToR switches 804 (e.g., to a pod-level switch or data center switch), as illustrated by connections to a network 820. In some embodiments, groups of computing racks 802 are managed as separate pods via pod manager(s) 806. In one embodiment, a single pod manager is used to manage all of the racks in the pod. Alternatively, distributed pod managers may be used for pod management operations. RSD environment 800 further includes a management interface 822 that is used to manage various aspects of the RSD environment. This includes managing rack configuration, with corresponding parameters stored as rack configuration data 824.

Any of the systems, data centers or racks discussed above, apart from being integrated in a typical data center, can also be implemented in other environments such as within a bay station, or other micro-data center, e.g., at the edge of a network.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds, and other design or performance constraints, as desired for a given implementation.

Some examples may be implemented using or as an article of manufacture or at least one computer-readable medium. A computer-readable medium may include a non-transitory storage medium to store program code. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the program code implements various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled, and/or interpreted programming language.

To the extent any of the teachings above can be embodied in a semiconductor chip, a description of a circuit design of the semiconductor chip for eventual targeting toward a semiconductor manufacturing process can take the form of various formats such as a (e.g., VHDL or Verilog) register transfer level (RTL) circuit description, a gate level circuit description, a transistor level circuit description or mask description or various combinations thereof. Such circuit descriptions, sometimes referred to as "IP Cores", are commonly embodied on one or more computer readable storage media (such as one or more CD-ROMs or other type of storage technology) and provided to and/or otherwise processed by and/or for a circuit design synthesis tool and/or mask generation tool. Such circuit descriptions may also be embedded with program code to be processed by a computer that implements the circuit design synthesis tool and/or mask generation tool.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software, and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences may also be performed according to alternative embodiments. Furthermore, additional sequences may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Apart from the claims that follow, methods have also been described including the method of constructing a block of null values for a logical block address (LBA) in response to a remote storage system having informed the network interface that the LBA was un-mappable. The method can also be articulated in program code that is stored on a machine readable medium that when processed by one or more processors causes the processors to perform the method.

The invention claimed is:

1. An apparatus, comprising:
   a network interface comprising a system interface, a media access interface and circuitry to construct a block of null values for a logical block address (LBA) in response to a remote storage system having informed the network interface that the LBA was un-mappable.

2. The apparatus of claim 1 wherein the circuitry is to recognize that the LBA is un-mappable from header information of a packet sent by the remote storage system, the packet sent in response to a read request sent by the network interface to the remote storage system.

3. The apparatus of claim 2 wherein the read request included the LBA.

4. The apparatus of claim 1 wherein the circuitry is to recognize that the LBA is un-mappable from a response sent by the remote storage system to a request initiated and sent by the networking interface that listed a plurality of LBAs including the LBA and requested the remote storage system to verify map-ability of the LBAs.

5. The apparatus of claim 4 wherein the circuitry is to initiate and send the request in response to the plurality of LBAs being greater than a predefined number.

6. The apparatus of claim 5 wherein the number is one thousand or greater.

7. The apparatus of claim 1 wherein the circuitry is to insert the block of null values into a read request response stream sent over the system interface.

8. A data center, comprising:
   a plurality of racks;
   a plurality of electronic systems installed into the plurality of racks;
   a network communicatively coupling the plurality of electronic systems; and,
   a network interface plugged into one of the electronic systems, the network interface comprising i), ii) and iii) below:
   i) a system interface to communicate within the one electronic system;
   ii) a media access interface to communicate with the network; and,
   iii) circuitry to construct a block of null values for a logical block address (LBA) in response to a remote storage system having informed the network interface that the LBA was un-mappable.

9. The data center of claim 8 wherein the circuitry is to recognize that the LBA is un-mappable from header information of a packet sent by the remote storage system, the packet sent in response to a read request sent by the network interface to the remote storage system.

10. The data center of claim 9 wherein the read request included the LBA.

11. The data center of claim 8 wherein the circuitry is to recognize that the LBA is un-mappable from a response sent by the remote storage system to a request initiated and sent by the networking interface that listed a plurality of LBAs including the LBA and requested the remote storage system to verify map-ability of the LBAs.

12. The data center of claim 11 wherein the circuitry is to initiate and send the request in response to the plurality of LBAs being greater than a predefined number.

13. The data center of claim 12 wherein the number is one thousand or greater.

14. The data center of claim 8 wherein the circuitry is to insert the block of null values into a read request response stream sent over the system interface.

15. The data center of claim 8 wherein the network interface communicates to the remote storage system with any of:
   NVMe;
   RDMA;
   SATA; and,
   SCSI.

16. The data center of claim 8 wherein the network comprises at least one of the following types of networks:
PCIe;
CXL;
Ethernet; and,
TCP/IP.

17. An apparatus, comprising:
a storage system comprising a), b), c) and d) below:
   a) at least one semiconductor chip to control the storage system;
   b) a plurality of physical storage devices;
   c) a first network interface to communicate to a remote system;
   d) circuitry of at least one of the at least one semiconductor chip and the plurality of physical storage devices to:
      i) construct a packet to be sent to a second network interface of the remote system, wherein the packet includes information to inform the second network interface that an LBA of a block stored within the physical storage devices is un-mappable; and,
      ii) not send a block of null values for the LBA to the network interface.

18. The apparatus of claim 17 wherein the information is within header information of a response to a read request sent by the second network interface, wherein, the read request comprises a plurality of LBAs including the LBA.

19. The apparatus of claim 17 wherein the packet is sent in response to a request initiated and sent by the second network interface to the storage system, wherein, the request requests the remote storage system to verify which of a plurality of LBAs including the LBA are mappable.

20. The apparatus of claim 19 wherein the packet conforms to one of the following protocols:
NVMe;
RDMA;
SATA; and,
SCSI.

* * * * *